(12) United States Patent
Ballard et al.

(10) Patent No.: US 9,286,253 B2
(45) Date of Patent: Mar. 15, 2016

(54) SYSTEM AND METHOD FOR PRESENTING DEVICES THROUGH AN SAS INITIATOR-CONNECTED DEVICE

(75) Inventors: Curtis C. Ballard, Eaton, CO (US);
Robert C. Elliott, Houston, TX (US);
Christopher Martin, Bath (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 644 days.

(21) Appl. No.: 13/011,194

(22) Filed: Jan. 21, 2011

(65) Prior Publication Data

US 2012/0191886 A1 Jul. 26, 2012

(51) Int. Cl.
*G06F 13/42* (2006.01)
*G06F 13/38* (2006.01)

(52) U.S. Cl.
CPC ...... *G06F 13/385* (2013.01); *G06F 2213/0028* (2013.01)

(58) Field of Classification Search
CPC ............................... G06F 13/42; G04F 13/385
USPC ............................................................ 710/3
See application file for complete search history.

(56) References Cited

U.S. PATENT DOCUMENTS

| | | | |
|---|---|---|---|
| 7,171,500 B2 * | 1/2007 | Day et al. | 710/106 |
| 7,454,565 B1 | 11/2008 | Justiss et al. | |
| 7,519,854 B2 | 4/2009 | Lucas et al. | |
| 7,668,925 B1 * | 2/2010 | Liao et al. | 709/212 |
| 2006/0282639 A1 | 12/2006 | Liu et al. | |
| 2007/0165660 A1 * | 7/2007 | Fang et al. | 370/410 |
| 2008/0133827 A1 * | 6/2008 | Topham et al. | 711/111 |
| 2009/0094620 A1 | 4/2009 | Kalwitz et al. | |
| 2010/0064086 A1 | 3/2010 | McCarty et al. | |

\* cited by examiner

*Primary Examiner* — Idriss N Alrobaye
*Assistant Examiner* — Brooke Taylor
(74) *Attorney, Agent, or Firm* — Pearl Cohen Zedek Latzer LLP

(57) ABSTRACT

A method, system and computer readable medium for presenting unique Serial Attached Small computer system interface (SAS) target devices through a single target device. The method includes embedding a SAS protocol chip within an initiator-connectable device, the SAS protocol chip having storage for at least two SAS addresses and configured to select a single address, loading two or more SAS addresses into the SAS protocol chip, and mapping a respective SAS address to one of the unique target devices. The system includes a SAS protocol chip having storage for at least two SAS addresses and a method for selecting a single SAS address, and a processor unit connected to the SAS protocol chip by an interface bus, the processor configured to load two or more identifier addresses into the SAS protocol chip. The computer readable medium contains instructions that cause a processor to perform the described methods.

13 Claims, 5 Drawing Sheets

400

410
Embed SAS protocol chip in SAS initiator-connectable device

420
Load identifier address(es) into SAS address register

430
Map identifier address(es) to unique target device

440
Emulate SAS expander functions by SAS initiator-connectable device

SYSTEM AND METHOD FOR PRESENTING DEVICES THROUGH AN SAS INITIATOR-CONNECTED DEVICE

BACKGROUND

Serial Attached SCSI (SAS) is a protocol used to move data to and from computer storage devices such as hard drives and tape drives. A SAS system includes initiators, targets, and a service delivery subsystem which may include expanders.

The initiator contains initiator ports and originates commands and task-management functions to be processed by a target device, and receives responses for the same requests. A target device contains logical units and target ports that process device-service and task-management requests. Each logical unit is assigned a logical unit number and a logical unit name within the target device. The target device may send responses through a target port and across a service delivery subsystem to the initiator device. A target device could be a hard disk, tape drive, or a disk array system.

A service delivery subsystem is that part of an input/output (I/O) system that transmits information between the initiator port and the target port. The service delivery subsystem includes board traces, cables, and may also include expanders. An expander facilitates communication between multiple SAS devices (e.g., the connection of multiple SAS end devices to a single initiator port).

Each device may contain one or more logical units that share the same ports and service delivery subsystem. The logical units may be the same type (e.g., a disk array may present many disk drives) or may be different types (e.g., a tape drive and a tape library may be presented by the same device). The same storage device (e.g., a tape library) may be presented through two different target devices as logical units, but the library is required to have different names for each connection so that they can be distinguished. Presenting the same storage device through two different paths using two different names is called multi-pathing. This multi-path connection may require a special software application installed between the application and the host bus adapters (HBAs) to convert the two paths into a single logical path. This application may manage which path is used for communication with the library.

A tape library may include a media changer device and one or more data transfer devices. A media changer using a SAS interface may have its SAS interface hosted by a data transfer device (e.g., a tape drive, optical disk drive, etc.). One possible connection method may be for the data transfer device to present two logical units to the initiator.

The logical view from the initiator may be a data transfer device with a media changer behind it. If the drive has to be removed or the drive fails and the communication link is lost to the drive, then the communication link to the media changer is also lost. If there are several drives in the library the rest of the drives may be functioning correctly but because commands cannot be sent to the media changer and no media can be loaded or unloaded, then the drives are unable to be used.

DETAILED DESCRIPTION

A method and system in accordance with an embodiment of the invention may allow a single target device to present two or more unique target devices to an initiator so the logical view from the initiator is of two or more independent target device connections through an expander. In the event of a communication interruption, or detection of an upcoming interruption, the media changer's firmware can move the configuration for the media changer SCSI interface over to a different data transfer device which may then expose the same media changer on the physical interface for that data transfer device. The initiator may see the exact same media changer through a different physical path. When connected properly the physical path difference may be invisible to the initiator.

A target device can be any SCSI device, including media changers. A media changer is a member of the subset of target devices which do not transfer read/write data. A data transfer device is a member of the subset of target devices which supports commands to read and write data.

Figure 1:
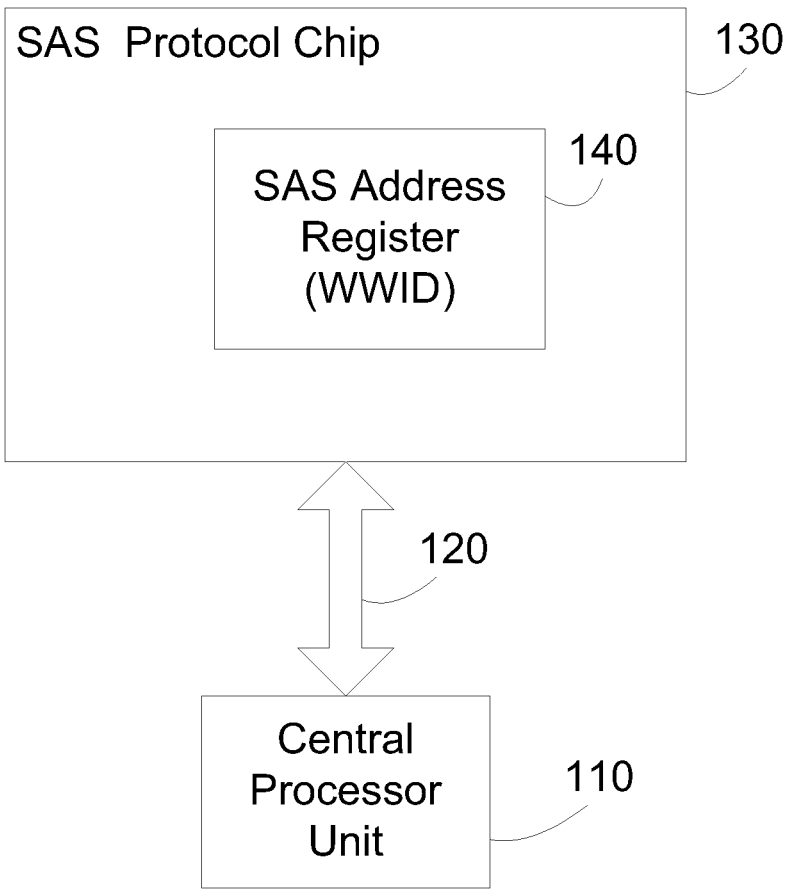
FIG. 1 illustrates a conventional SAS protocol chip.

FIG. 1 illustrates conventional system 100 that may include central processor unit (CPU) 110 connected to conventional SAS protocol chip 130 via interface bus 120. Conventional SAS protocol chip 130 may include world wide identifier (WWID) register 140, which may identify a particular SAS target device (not shown).

An expander function is a feature of the SAS standard that allows a hardware device to switch SAS traffic between multiple devices so that one port can be expanded into several ports. In accordance with an embodiment of the invention, the hardware SAS expander function may be emulated in software and/or hardware inside the target device, so that a target device may appear to the SAS initiator as if it is a SAS expander.

Figure 2:
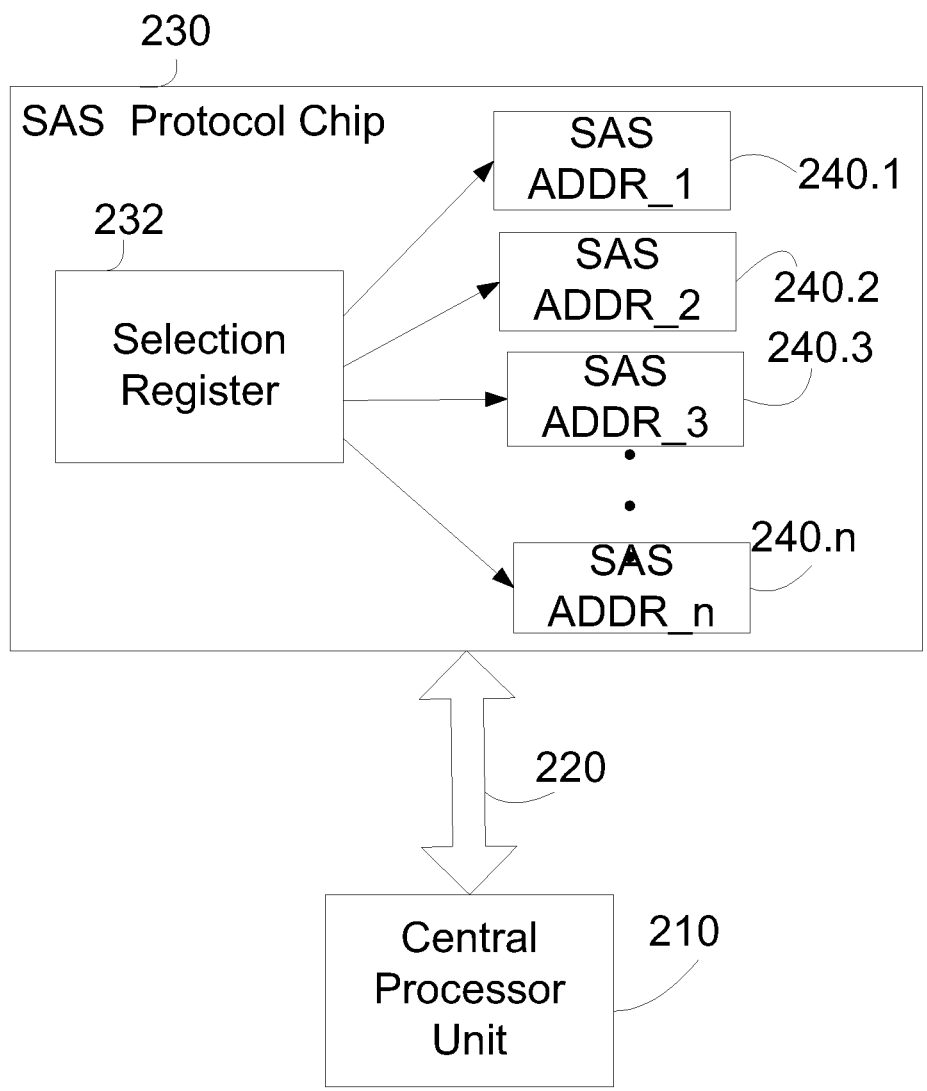
FIG. 2 illustrates a SAS protocol chip in accordance with an embodiment of the invention.

FIG. 2 illustrates system 200 in accordance with an embodiment of the invention. System 200 may include CPU 210 connected via interface bus 220 to SAS protocol chip 230. Selection register 232 may be internal to SAS protocol chip 230. Selection register 232 may be in communication with n multiple SAS address registers 240.1, 240.2, 240.3, . . . 240.n with each SAS address register able to store at least one identifier for a particular, unique SAS target device.

CPU 210 may emulate an SAS expander and load an identifier into one or more of SAS address registers 240.1, 240.2, 240.3 . . . 240.n located in SAS protocol chip 230. The SAS protocol chip may be configured to accept commands or task management functions addressed to any of the SAS addresses held in the SAS address registers. When a command or task management function has been received, CPU 210 may use selection register 232 to select the appropriate SAS address to be provided in a source field of the response.

When a command or task management function contains an identifier addressing a target device (either hardware and/or virtual—e.g., a segmented portion of memory within a larger memory store), CPU 210 may use selection register 232 to select the SAS address register for the target device corresponding to the identifier address in the command or task management function. Selection register 232 may be used to select which SAS address register should be accessed to retrieve an address. The SAS address registers may be contained in a memory, a look up table, or other storage mechanism. SAS protocol chip 230 may be implemented in hardware, software, and/or a combination of hardware and non-transitory software (e.g., firmware).

In accordance with an embodiment of the invention, SAS protocol chip 230 may be embedded within a target device (e.g., a tape drive, optical disk drive, etc.) hosting a SCSI interface. By embedding SAS protocol chip 230 within the target device, the target device may be converted to a virtual SAS expander, as described below. A target device configured as a virtual SAS expander may be connected to a media changer or other hardware target device, and/or a virtual target device.

Figure 3:
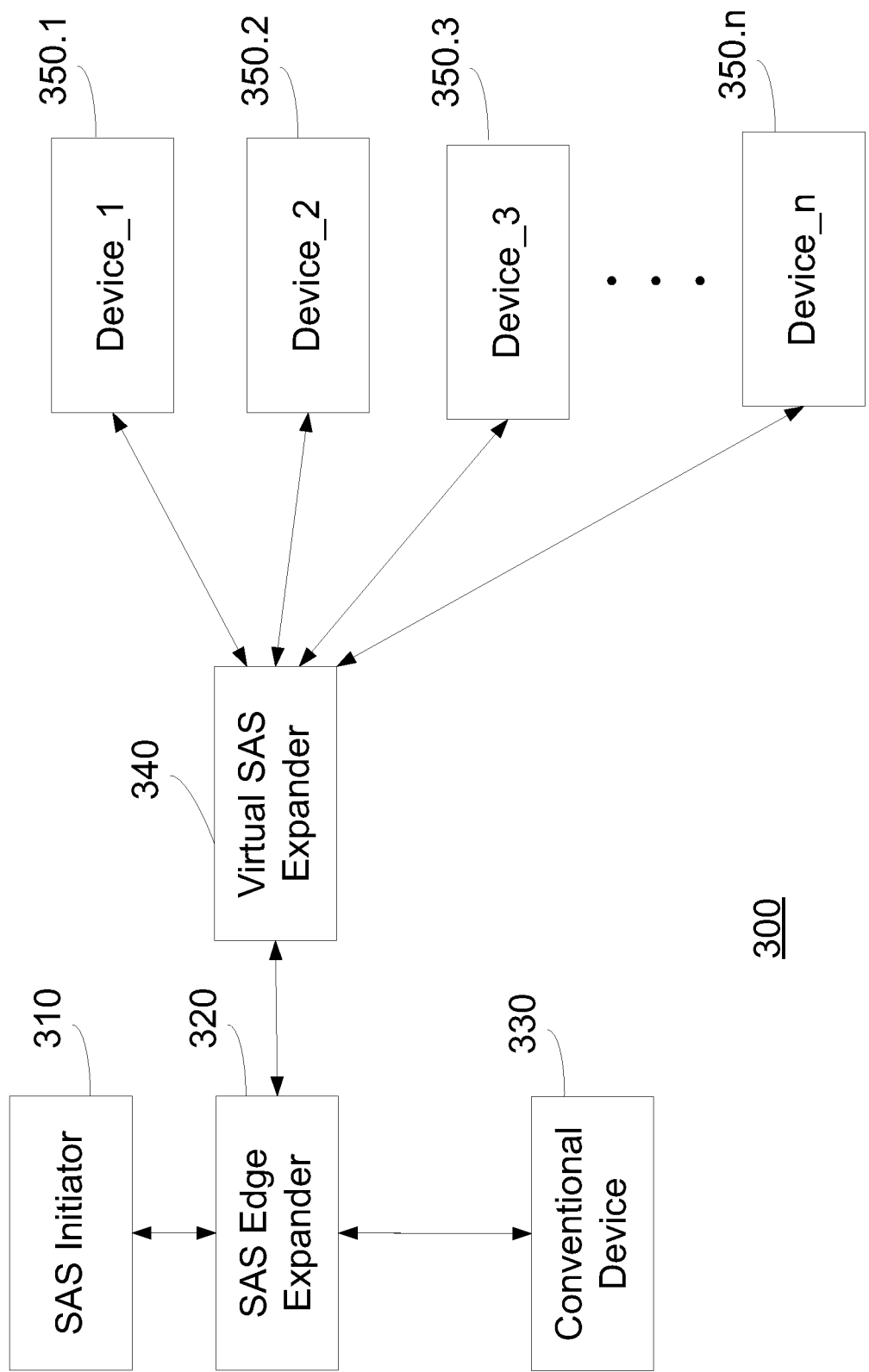
FIG. 3 illustrates a system in accordance with an embodiment of the invention.

FIG. 3 illustrates system 300 in accordance with an embodiment of the invention. System 300 may include SAS initiator device 310 connected to SAS edge expander 320. The SAS edge expander may allow for multiple target devices to be connected to the SAS initiator device. For example, conventional device 330 and virtual SAS expander 340 are shown connected to SAS edge expander 320 in FIG. 3. Virtual SAS expander 340 may be a target device hosting a SCSI interface, where the target device has been embedded with a SAS protocol chip in accordance with an embodiment of the invention. Virtual SAS expander 340 may be connected and/or coupled to SAS initiator 310 either directly or indirectly—e.g., by connection to SAS 320 edge expander.

Virtual SAS expander 340 may host n virtual target devices, where n may be equal to 255 under current SAS standards. In other implementations, n may be greater or less than 255. Each of the n virtual target devices may be associated with a SAS address register in the SAS protocol chip embedded within virtual SAS expander 340. As described above, each SAS address register may have a corresponding identifier address. These identifier addresses may map into target devices 350.1, 350.2, 350.3, . . . 350.n. Target devices 350.1, 350.2, 350.3, . . . 350.n may be physical hardware target devices and/or virtual target devices.

In accordance with an embodiment of the invention, virtual SAS expander 340 may emulate SAS expander functions that may be required to report target devices 350.1, 350.2, 350.3, . . . 350.n. For example, when a target device discovery query is run to identify the target devices behind the virtual SAS expander, the target device embedded with a SAS protocol chip in accordance with an embodiment of the invention, may emulate the functions required to report that there is, for example, a media changer and a tape drive behind it. By reporting as an expander the data transfer device can report different names and/or SAS address identifiers for any other target devices (hardware and/or virtual) behind the data transfer device.

In accordance with an embodiment of the invention, virtual SAS expander 340 may report two or more distinct target devices to SAS initiator 310.

In accordance with an embodiment of the invention, virtual SAS expander 340 may appear, from the SAS interface, as having multiple target devices attached behind an expander. Virtual SAS expander 340, may include one or more of the following capabilities:

a) identify itself as an edge expander device with one SAS address in the IDENTIFY address frame;
b) respond as a self-configuring expander to SMP REPORT GENERAL with up to n virtual phys. Present each physical phy as a subtractive routing phy;
c) respond for each of the virtual phys to SMP DISCOVER by reporting a virtual target device with a unique SAS address attached, consuming n additional SAS addresses. The SAS addresses may be completely arbitrary and chosen by software, not dictated by hardware.
d) respond as an expander to other SMP functions;
e) respond and/or generate SSP, STP, and SMP traffic for each of target devices 350.1, 350.2, 350.3, . . . 350.n using a corresponding unique SAS address from the selection register within the embedded SAS protocol chip;
f) support SAS-2 zoning In accordance with an embodiment of the invention, virtual SAS expander 340 embedded with SAS protocol chip 230 does not require any special software on the SAS initiator so it is operating system independent, and does not require development (and maintenance) of multiple operating system specific software packages.

Figure 4:
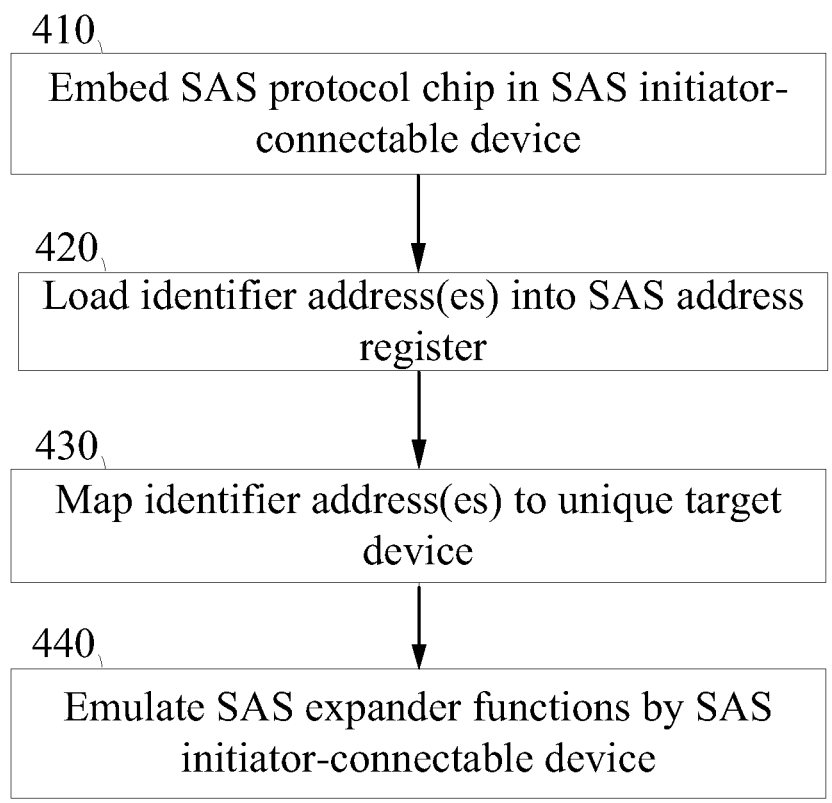
FIG. 4 illustrates a process in accordance with an embodiment of the invention.

FIG. 4 illustrates process 400 in accordance with an embodiment of the invention. Process 400 provides a method for presenting two or more unique target devices to a SAS initiator through a single initiator-connected device.

Process 400 may embed a SAS protocol chip, step 410, in a target device suitable for connection to a SAS initiator. The SAS initiator-connectable device may be a data transfer device. The SAS protocol chip may include a selection register which is in communication with multiple (e.g., two or more) SAS address registers. Embedding the SAS protocol chip within the initiator-connectable target device may create a virtual SAS expander.

Identifier addresses may be loaded, step 420, into the SAS address registers within the embedded SAS protocol chip. Each SAS address register may be selected using the selection register.

At step 430, process 400 may map an identifier address within a SAS address register to a particular, unique target device.

The initiator-connectable device (e.g., a virtual SAS expander) may emulate SAS expander functions, step 440.

Figure 5:
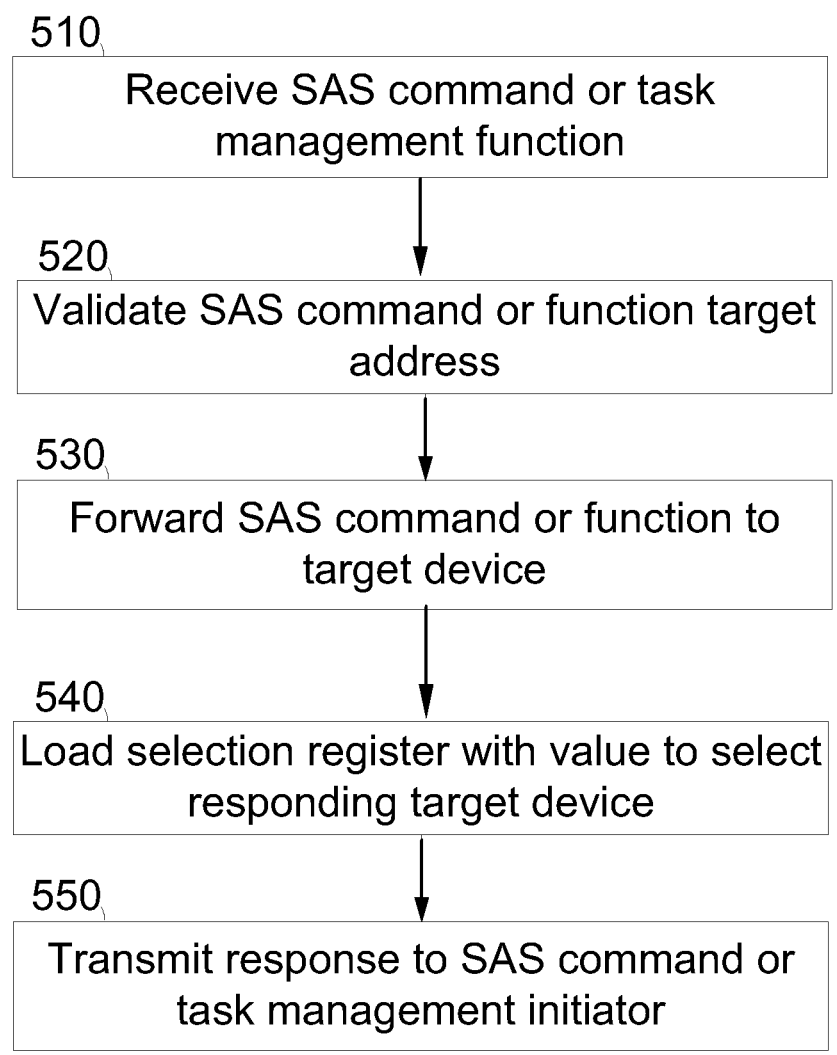
FIG. 5 illustrates a process in accordance with an embodiment of the invention.

FIG. 5 illustrates process 500 in accordance with an embodiment of the invention. A SAS protocol chip in accordance with an embodiment of the invention may receive, step 510, a SAS command or task management function.

The first function that may be performed is to validate, step 520, whether the target address within the received SAS command or task function matches one of the targets being presented by the particular SAS initiator-connectable device (i.e., the target address is one of the ones loaded into the SAS address registers). If there is a match, the command or task management function may be accepted by the SAS initiator-connectable device, which then may forward the command or task management function, step 530, to the target device (real or virtual) identified by the target address within the SAS command or management function.

After the target device has prepared a response, the emulation software may load the selection register with a value required to select the SAS address for the responding target device, step 540. The SAS protocol chip may then transmit the response to the SAS command or management function back to the initiator of the command/function with the source field set to the selected SAS address, step 550, so the SAS command or management function initiator is able to identify that the requested device has responded.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method of presenting two or more unique target devices to a SAS initiator through a single initiator-connected device in accordance with the above-described embodiments of the invention.

The non-volatile memory and/or computer-readable medium may be a non-transitory computer-readable media including all forms and types of memory and all computer-readable media except for a transitory, propagating signal.

While there have been shown and described fundamental novel features of the invention as applied to several embodiments, it will be understood that various omissions, substitutions, and changes in the form, detail, and operation of the illustrated embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for presenting unique serial attached small computer system interface (SAS) target devices through a SAS initiator-connectable device, the method comprising:
    embedding a SAS protocol chip that includes a selection register and at least two SAS address registers within the SAS initiator-connectable device, the SAS protocol chip configured to access at least two SAS addresses that are stored on the SAS protocol chip;
    loading the at least two SAS addresses into respective ones of the SAS address registers;
    respectively associating respective values within the selection register with the at least two SAS address registers;
    mapping, within the SAS protocol chip, a respective SAS address to each of the unique SAS target devices, wherein each SAS address respectively identifies one of the unique SAS target devices; and
    emulating, by the SAS initiator-connectable device, at least one SAS expander to provide access to each of the unique SAS target devices by the respective SAS address, wherein the SAS initiator-connectable device is a data transfer device.

2. The method of claim 1, further including the steps of:
    receiving an SAS command or function;
    matching a target address within the received SAS command or function to one of the at least two SAS addresses; and
    forwarding the SAS command or function to the target device identified by the matching SAS addresses.

3. The method of claim 2, further including the steps of:
    transmitting a response from the identified target device to the SAS command or function initiator.

4. A non-transitory computer readable medium having stored thereon instructions which when executed by a processor cause the processor to perform the method of:
    configuring a SAS protocol chip that includes a selection register and at least two SAS address registers embedded within a SAS initiator-connectable device to access at least two SAS addresses that are stored on the SAS protocol chip;
    loading the at least two SAS addresses into respective ones of SAS address registers within the SAS protocol chip; and
    respectively associating respective values within a selection register of the SAS protocol chip with at least two SAS address registers;
    mapping, within the SAS protocol chip, the at least two SAS addresses to respective unique target devices, wherein each SAS address respectively identifies one of the unique SAS target device; and
    emulating, by the SAS initiator-connectable device, at least one SAS expander to provide access to each of the unique SAS target devices by the respective SAS address, wherein the SAS initiator-connectable device is a data transfer device.

5. The non-transitory computer readable medium of claim 4, further storing instructions for emulating, by the SAS initiator-connectable device, at least one SAS expander function.

6. The non-transitory computer readable medium of claim 4, further storing instructions for:
    receiving an SAS command or function;
    matching a target address within the received SAS command or function to one of the at least two SAS addresses; and
    forwarding the SAS command or function to the target device identified by the matching SAS addresses.

7. The non-transitory computer readable medium of claim 6, further storing instructions for transmitting a response from the identified target device to the SAS command or function initiator.

8. A system for presenting unique target devices through a single serial attached small computer system interface (SAS) target device, the system comprising:
    a SAS protocol chip having storage for at least two SAS addresses and configured to select a single address, the SAS protocol chip embedded in the SAS target device to form a virtual SAS expander, the virtual SAS expander to emulate at least one SAS expander to provide access to each unique target device by a respective identifier address, wherein the SAS target device is a data transfer device; and
    a processor unit connected to the SAS protocol chip by an interface bus, the processor unit configured to load two or more identifier addresses into the SAS protocol chip, wherein the respective identifier address is mapped, within the SAS protocol chip, to one of the unique target devices and wherein each SAS address respectively identifies one of the unique target devices.

9. The system of claim 8, wherein the two or more identifier addresses are stored in one of memory, a look up table, hardware registers, or other storage mechanism.

10. The system of claim 8, wherein the SAS protocol chip is implemented in at least one of hardware and non-transitory software.

11. The system of claim 8, further including the virtual SAS expander coupled to a SAS initiator.

12. The system of claim 11, wherein the virtual SAS expander is coupled to the SAS initiator at least one of directly or indirectly.

13. The system of claim 8, further including the unique target devices connected to the virtual SAS expander.

* * * * *